United States Patent [19]
Van Dusseldorp

[11] Patent Number: 5,943,008
[45] Date of Patent: Aug. 24, 1999

[54] SINGLE GLOBAL POSITIONING SYSTEM RECEIVER CAPABLE OF ATTITUDE DETERMINATION

[75] Inventor: David L. Van Dusseldorp, Cedar Rapids, Iowa

[73] Assignee: Rockwell Science Center, Inc., Thousand Oaks, Calif.

[21] Appl. No.: 08/935,943

[22] Filed: Sep. 23, 1997

[51] Int. Cl.⁶ .............................. G01S 5/02; H04B 7/185
[52] U.S. Cl. ........................................... 342/357; 701/213
[58] Field of Search .................................... 342/357, 423, 342/445; 701/213

[56] References Cited

U.S. PATENT DOCUMENTS

| | | | |
|---|---|---|---|
| 4,809,005 | 2/1989 | Counselman, III | 342/352 |
| 4,894,662 | 1/1990 | Counselman | 342/357 |
| 5,185,610 | 2/1993 | Ward et al. | 342/357 |
| 5,268,695 | 12/1993 | Dentinger et al. | 342/357 |
| 5,451,963 | 9/1995 | Lempicke | 342/357 |
| 5,471,218 | 11/1995 | Talbot et al. | 342/357 |
| 5,497,161 | 3/1996 | Tsui | 342/147 |
| 5,502,641 | 3/1996 | Isomura | 364/449 |
| 5,534,875 | 7/1996 | Diefes et al. | 342/357 |
| 5,548,293 | 8/1996 | Cohen | 342/357 |
| 5,570,097 | 10/1996 | Aguado | 342/357 |
| 5,623,244 | 4/1997 | Cooper | 340/425.5 |
| 5,648,901 | 7/1997 | Gudat et al. | 364/424 |
| 5,757,316 | 5/1998 | Buchler | 342/357 |

*Primary Examiner*—Mark Hellner
*Attorney, Agent, or Firm*—Kyle Eppele; James P. O'Shaughnessy

[57] ABSTRACT

A platform attitude determination can be made with a single receiver in a global positioning system (GPS). The receiver receives at least three sets of GPS signals from three antennas. Two of the GPS signals are delayed so that the receiver receives each GPS signal in separate time domain slots. In this way, the synchronization of separate GPS receivers does not have to be accomplished.

20 Claims, 3 Drawing Sheets

SINGLE GLOBAL POSITIONING SYSTEM RECEIVER CAPABLE OF ATTITUDE DETERMINATION

FIELD OF THE INVENTION

The present invention relates to electronic navigational and positioning systems. More particularly, the present invention relates to a single satellite positioning or global positioning system (GPS) receiver capable of attitude determination.

BACKGROUND OF THE INVENTION

Positioning systems which provide attitude information are utilized in a variety of applications. For example, backpacks, planes, missiles, boats, helicopters, and vehicles often require information as to their attitude factor, e.g. the direction the vehicle is pointing in a horizontal plane (e.g., the azimuth angle) and the direction the vehicle is pointing in a vertical direction (e.g., the elevation angle). Alternatively, other coordinate systems can be utilized to provide attitude information in a variety of forms and coordinates.

Heretofore, attitude information has been generated by mechanical and electrical devices. Mechanical devices that include levels and compasses can provide indications of azimuth and elevation angles. However, levels and compasses are prone to wear and are somewhat inaccurate.

Electrical attitude determination systems often are part of expensive inertial navigational systems or satellite positioning systems, such as, global positioning systems (GPS). Satellite positioning systems, such as, global positioning system (GPS) navigational systems, are often used by military and civilian naval, ground, and airborne vehicles for navigation. GPS receiver units receive positioning signals from a series of 24 Navstar satellites deployed in 12-hour orbits about Earth and dispersed in six orbital planes at an altitude of 11,200 miles. The satellites continuously emit electronic GPS signals (or telemetry) for reception by ground, airborne, or naval receiver units. By receiving GPS signals from four or more satellites, a properly configured receiver unit can accurately determine its position in three dimensions and time.

GPS navigational systems have tremendous benefits over other positioning systems in that they rely upon no visual, magnetic, or other point of reference. These advantages are particularly important in applications, such as, aviation, naval navigation, and defense applications where polar regions are traversed and where conventional magnetic navigational devices are rendered less effective by local magnetic conditions.

Conventional GPS navigational systems capable of attitude determination, such as, system 10 illustrated in FIG. 1, generally include at least three antennas 12A–C coupled to at least three GPS receiving units 14A–C and a processor 16. A receiving unit is defined as a device that processes one signal input of available Code Division Multiple Access (CDMA) satellite signals with one or more demodulation channels that are each capable of outputting the code and/or carrier phase information from a selected satellite signal. System 10 determines a coordinate position for the vehicle (not shown) upon which it is implemented based upon satellite signal code and carrier phase information received on buses 18A–C from receivers 14A–C. Additionally, processor 16 compares satellite signal code and carrier phase information to compute attitude information at an output 28 for system 10. System 10 can compute the attitude information in a variety of coordinate systems for display or further use.

Generally, kinematic techniques use the comparison of carrier phase information from different satellites to determine the relative positioning of antennas 12A–C. Processor 16 utilizes the relative positioning of antennas 12A–C to determine the attitude information. The calculation of the attitude information from the carrier phase information on buses 18A–C is well known in the art and is beyond the scope of the present application.

To make accurate comparisons of the code and the carrier phase information on buses 18A–C, receivers 14A–C must be synchronized via a synchronization bus or signal 22. Receivers 14A–C must be synchronized to ensure that time, frequency, and phase references associated with the satellite signals received on antennas 12A–C are accurate. Synchronization can be very difficult and adds to the cost and complexity associated with system 10. Additionally, system 10 requires at least three separate GPS receivers 14A–C (one for each antenna), which can be expensive and can add to the size, power consumption, and complexity of the system 10.

Thus, there is a need for a satellite navigational system which can determine attitude information without the use of multiple receivers. Further still, there is a need for a GPS navigational system which does not require synchronization between individual receiver units. Even further still, there is a need for a low-cost GPS navigational system capable of attitude determination.

SUMMARY OF THE INVENTION

The present invention relates to a Global Positioning System capable of determining an attitude factor. The system includes a receiver having an antenna interface, a first antenna, a second antenna, and a third antenna. The first, second, and third antennas are electrically coupled to the antenna interface. The second antenna is disposed in time delay in a fixed relationship to the first antenna, and the third antenna is disposed in time delay in a fixed relationship to the first antenna. The second antenna is electrically coupled to the antenna interface through a first delay circuit, and the third antenna is electrically coupled to the antenna interface through a second delay circuit. The receiver compares a first signal received by the first antenna, a second signal received by the second antenna, and a third signal received by the third antenna to determine the attitude factor.

The present invention further relates to a positioning receiver including at least three antennas and a receiving means. The at least three antennas receive the signals from the same satellites as those signals appear at each antennas specific location in space. The outputs of the antennas are disposed in a fixed relationship in time with respect to each other. The second set and the third set are delayed with respect to the first set. The receiving means processes the first set, the second set, and the third set and determines an attitude factor in accordance with the first set, the second set, and the third set and the fixed time delay relationship.

The present invention even further relates to a method of determining an attitude factor for a vehicle. The vehicle includes a positioning system having a first antenna, a second antenna, and a third antenna. The first antenna, the second antenna, and the third antenna are disposed in a positional relationship. The method includes receiving a first set of satellite signals on the first antenna, receiving a second set of the same satellite signals on the second antenna, delaying the second set of signals for a first time with respect to the first set, receiving a third set of the same satellite signals on the third antenna, delaying the third set of satellite signals for a second time with respect to the first set, and determining the attitude factor by processing the first set, the second set, and the third set and the positional relationship.

According to one exemplary aspect of the present invention, satellite positioning signals, such as, GPS signals, are received from satellites on at least three antennas. Two of the three antennas include delay circuits which delay the GPS signals. The receiver analyzes the GPS signals to determine the relative position of each antenna to calculate an attitude factor. The global positioning signals are delayed to allow a single receiver to calculate the position of three antennas without interference from GPS signals received on other antennas. The delay circuits allow the signals to be processed without interference.

In accordance with another aspect of the present invention, at least three antennas are fixed to a platform which is provided on a vehicle. The antennas are spaced approximately a meter apart. The actual spacing used is a result of many application factors such as space available and desired accuracy and are determined by methods in the present state-of-the-art, and they are not unique to this approach. The platform can be a jeep, a car, a tank, a missile, an airplane, a boat, a backpack or any mobile or portable system. The receiver can calculate attitude factors, such as, azimuth angle and elevation angle. Alternatively, other attitude factors and other coordinate system positions can be calculated.

BRIEF DESCRIPTION OF THE DRAWINGS

The invention will hereinafter be described with reference with the accompanying drawings wherein like numerals denote like elements, and.

DETAILED DESCRIPTION OF THE PREFERRED EMBODIMENTS

Figure 2:
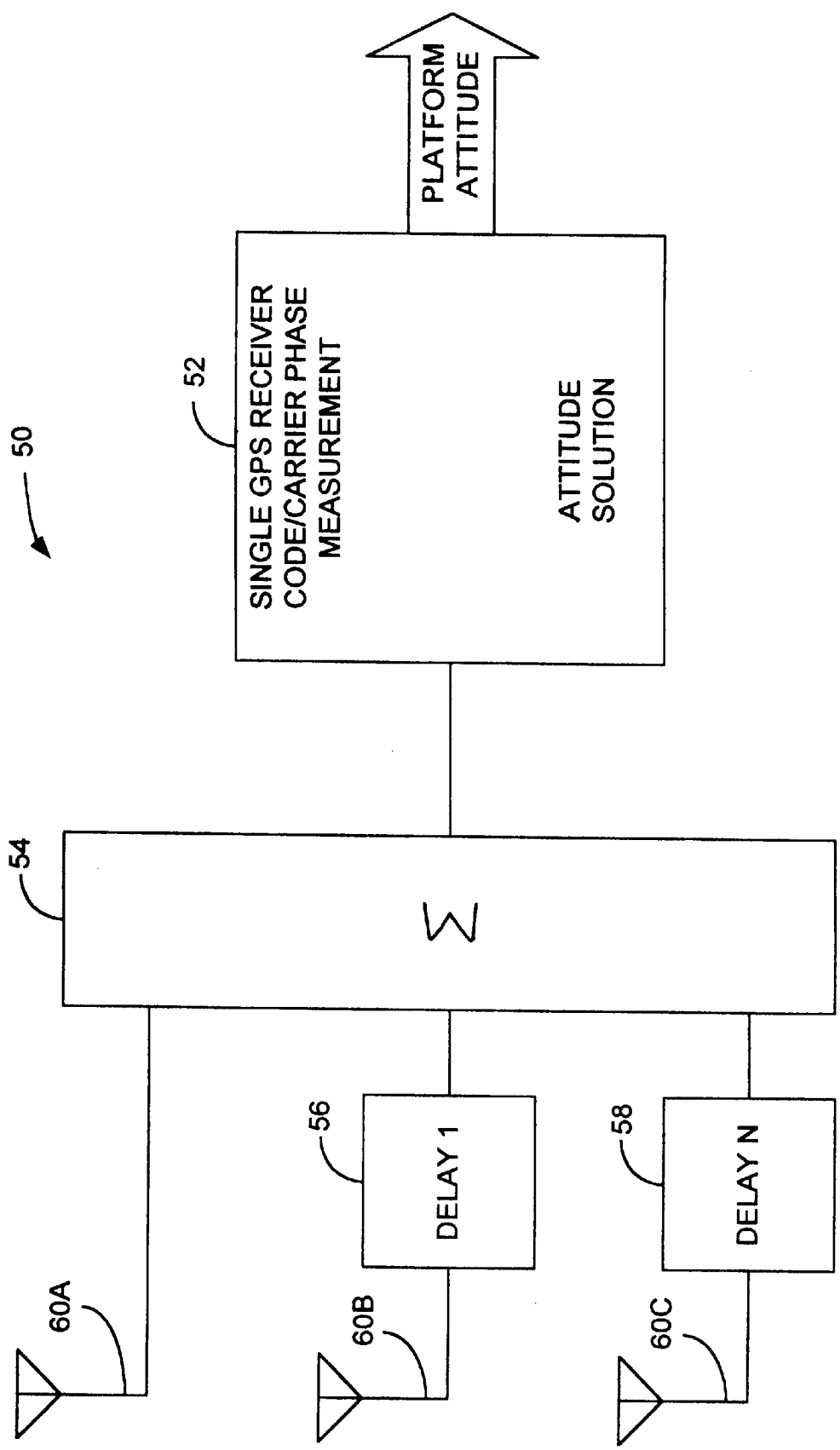
FIG. 2 is a GPS receiver system capable of calculating an attitude factor in accordance with an exemplary embodiment of the present invention.

With reference to FIG. 2, a satellite positioning system or global positioning system (GPS) receiver system 50 includes a single receiver 52, an antenna interface 54, a delay circuit 56, a delay circuit 58, and an array of antennas 60A, 60B, and 60C. The array of antennas 60A, 60B, and 60C preferably includes at least three antennas 60A–C. Antennas 60A–C can be patch antennas, omni-directional antennas, or any type of antenna capable of receiving satellite signals, such as, GPS timing signals from Navstar satellites or other sources.

Figure 1:
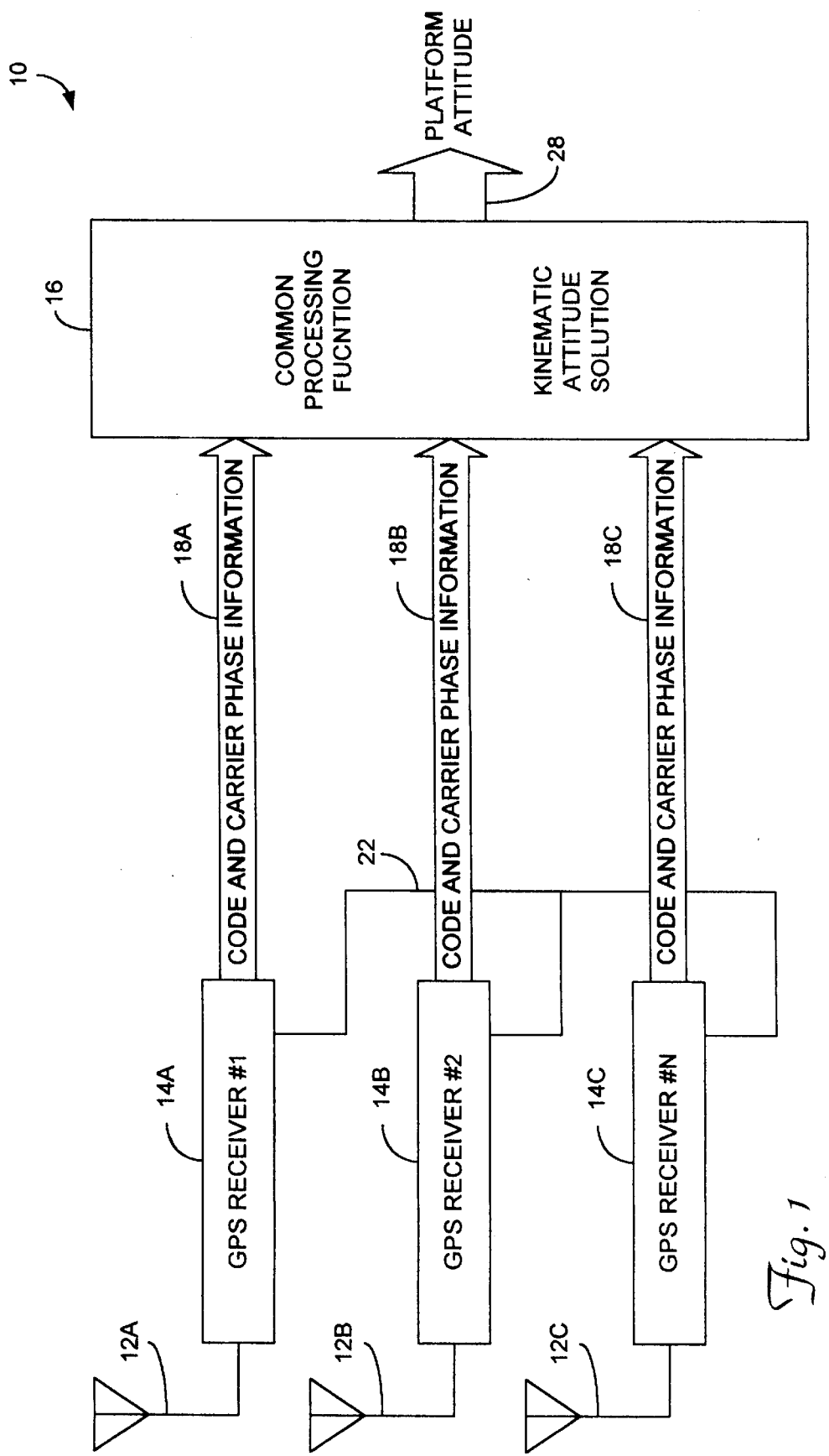
FIG. 1 is a simplified block diagram of a prior art global positioning system (GPS) navigational system capable of calculating an attitude factor.

Antennas 60A–C are preferably mounted to a platform (not shown), such as, a vehicle, a boat, a missile, an airplane, a fuselage, a backpack, or other mobile system. Antennas 60A–C can be in a fixed relationship and are preferably spaced approximately one meter apart or other distance consistent with the application and accuracy constraints. However, closer or wider spacings can be utilized, depending upon the size of the vehicle. Antenna interface 54 is preferably a radio frequency (RF) summer, or other device for coupling to antennas 60A–C and to receiver 52. Unlike system 10 illustrated in FIG. 1, antennas 60A–C are electrically coupled to a single receiver 52 through interface 54.

Delay circuits 56 and 58 can be any circuitry for providing a delay so receiver 52 receives the signals from antennas 60A, 60B, and 60C in separate time domain slots. Preferably, delay circuit 56 provides a 200 nanosecond (ns) delay, and circuit 58 provides a 400 ns delay. Circuits 56 and 58 can be a cable, such as, a coaxial cable having a length of ⅔ of a foot per ns. Alternatively, other delay devices and delay circuitry can be utilized.

Receiver 52 can be a GPS receiver capable of kinematic techniques utilizing carrier phase information for best accuracy. Receiver 52 can include four channels or more for simultaneously receiving satellite signals or GPS timing signals on one of antennas 60A–C from four different satellites. Receiving signals from four different satellites allows a precise three-dimensional position (e.g., longitude, latitude, and altitude) to be calculated. The satellite signals include satellite codes and carrier phase information.

When receiver 52 is a four-channel receiver, receiver 52 sequentially receives a set of GPS timing signals on antenna 60A, followed by a set of GPS timing signals on antenna 60B, followed by a set of GPS timing signals on antenna 60C. However, any order can be used. Preferably, each channel is dedicated to a single satellite (four channels for four satellites). Sequentially receiving the sets of GPS signals on antennas 60A–C increases the amount of time required to determine an attitude factor.

Alternatively, receiver 52 can have more than four channels. In one such embodiment, receiver 52 has 12 channels, where channels 1–4 are dedicated to receive a set of GPS timing signals from four satellites on antenna 60A, channels 5–8 are dedicated to receive a set of GPS timing signals from four satellites on antenna 60B, and channels 9–12 are dedicated to receive a set of GPS timing signals from four satellites on antenna 60C. The use of a receiver 52 having 12 channels allows simultaneous reception of the sets of GPS timing signals so the attitude factor can be determined more quickly.

The operation of receiving system 50 is discussed below as follows. Receiver 52 receives three sets of satellite signals from antennas 60A–C through interface 54. The sets of satellite signals provide satellite code and carrier phase information from which the relative position of each of antennas 60A, 60B, and 60C can be determined. The determination of relative position in response to sets of satellite signals is well known in the art. Receiver 52 receives a delayed set of satellite signals through circuit 56 from antenna 60B. Similarly, receiver 52 receives a further delayed set of satellite GPS signals from antenna 60C through circuit 58.

Figure 3:
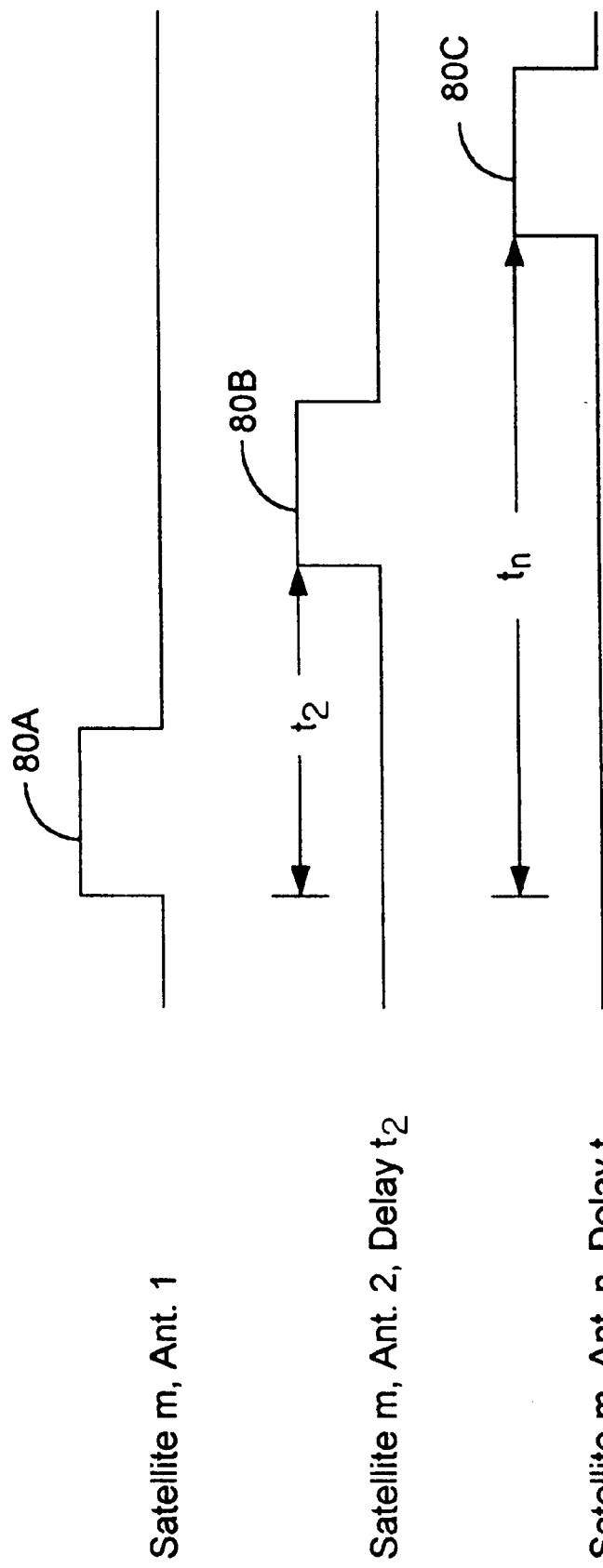
FIG. 3 is a timing diagram showing a schematic representation of GPS timing signals being received by the receiver system illustrated in FIG. 2.

With reference to FIG. 3, the sets of GPS satellite signals received on antennas 60A–C are schematically represented. GPS signal 80A represents the set of satellite signals output by antenna 60A. GPS signal 80B represents the set of satellite signals output by antenna 60B. GPS signal 80C represents the set of satellite signals output by antenna 60C. GPS signal 80B is delayed by a time period of $t_2$ (e.g., 200 ns) with respect to GPS signal 80A. Similarly, GPS signal 80C is delayed by a time period of $t_n$ (e.g., 400 ns) with respect to GPS signal 80A. The time delays $t_2$ and $t_n$ allow the single receiver 52 to track GPS signals 80A, 80B, and 80C without interference from each other.

With reference to FIGS. 2 and 3, receiver 52 calculates the relative position of antennas 60A, 60B, and 60C in response to GPS signals 80A, 80B, and 80C. Receiver 52 utilizes the relative positions, the known delays ($t_2$ and $t_n$), and the known relationship between antennas 60A–C to determine attitude factors. Attitude factors can include azimuth angles and elevation angles for the platform (not shown). Receiver 52 additionally calculates the position of the platform (generally, the center of the platform or its center of gravity) in response to GPS signals 80A, 80B, and/or 80C.

Receiver 52 preferably determines relative position by searching and acquiring the codes and carrier phase information on GPS signal 80A. The GPS signal 80A does not have any added delay. Receiver 52 then searches and acquires the codes and carrier phase information on signal 80B. Receiver 52 delays its local code by the delay associated with circuit 56 ($t_2$). Preferably, receiver 52 searches and acquires the code and carrier phase information on signal 80C. Receiver 52 delays its local code by the delay associated with circuit 58 ($t_n$).

Receiver 52 determines the slight differences from the predicted delays associated with antennas 60B and 60C and from the code and carrier phase information on signals 80B and 80C. These slight differences are then utilized to determine the difference between positions of antennas 60A, 60B, and 60C. The attitude can then be determined from the differences in antenna positions in accordance with the known positions of antennas 60A–C.

Receiver 52 advantageously does not require synchronization circuits because synchronization is automatic as only a single receiver 52 is utilized. The use of a single receiver 52 decreases cost, weight, and size associated with system 50.

Array of antennas 60A–C can include more than three antennas. For example, an array of four or more antennas can be utilized to provide redundancy checks. Delays can be provided for the additional antennas.

It is understood that, while particular examples are given, they describe a preferred embodiment of the present invention and are for the purpose of illustration only. The apparatus and method of the invention is not limited to the precise details and conditions disclosed. For example, although an array of three antennas 60A–C is utilized, more antennas can be used. Further, although a GPS system is discussed, any positioning system based on timing or positioning signals can utilize the principles of the present invention. Various changes may be made to the details disclosed without departing from the spirit of the invention which is defined by the following claims.

What is claimed is:

1. A global positioning system capable of determining an attitude factor, the system comprising:
   a receiver having an antenna interface;
   a first antenna electrically coupled to the antenna interface;
   a second antenna disposed in a first fixed relationship to the first antenna and electrically coupled to the antenna interface through a first delay circuit;
   a third antenna disposed in a fixed second relationship to the first antenna and electrically coupled to the antenna interface through a second delay circuit; and
   wherein the receiver compares a first signal received by the first antenna, a second signal received by the second antenna, and a third signal received by the third antenna to determine the attitude factor.

2. The system of claim 1, wherein the attitude factor includes an azimuth angle.

3. The system of claim 1, wherein the attitude factor includes an elevation angle.

4. The system of claim 1, wherein the second signal is adjusted in accordance with a first delay associated with the first delay circuit.

5. The system of claim 4, wherein the third signal is adjusted in accordance with a second delay associated with the second delay circuit.

6. The system of claim 5, wherein the first signal, the second signal, and the third signal include carrier phase information.

7. The system of claim 5, wherein the receiver synchronously receives the first signal, the second signal, and the third signal on a group of channels.

8. A positioning receiver, comprising:
   at least three antennas disposed in a fixed relationship to each other to receive a first set of satellite signals, a second set of satellite signals, and a third set of satellite signals, the second set and the third set being delayed with respect to the first set; and
   receiving means for processing the first set, the second set, and the third set, and determining an attitude factor in accordance with the first set, the second set, and the third set and the fixed relationship.

9. The receiver of claim 8, wherein the attitude factor includes an azimuth angle.

10. The receiver of claim 9, wherein the attitude factor includes an elevation angle.

11. The receiver of claim 8, wherein the third set is delayed with respect to the second set.

12. The receiver of claim 11, wherein the receiver means calculates a first relative position in response to the first set, a second relative position in response to the second set, and a third relative position in response to the third set, the first set, the second set, and the third set are in different time domain slots to prevent the first set from affecting determination of the second relative position and the third relative position.

13. The receiver of claim 8, wherein the first set, the second set, and the third set include satellite code and carrier phase information.

14. The receiver of claim 12, wherein the attitude factor is determined by adjusting the second set and the third set in accordance with a first delay and a second delay.

15. The receiver of claim 8, wherein the receiver means simultaneously receives the first set, the second set, and the third set on three separate groups of channels.

16. The receiver of claim 8, wherein the receiver means sequentially receives the first set, the second set, and the third set on a group of channels.

17. A method of determining an attitude factor for a vehicle, the vehicle including a positioning system having a first antenna, a second antenna, and a third antenna, the first antenna, the second antenna, and the third antenna being disposed in a positional relationship, the method comprising:
   receiving a first set of satellite signals on the first antenna;
   receiving a second set of satellite signals on the second antenna;
   delaying the second set of satellite signals for a first time with respect to the first set;
   receiving a third set of satellite signals on the third antenna;
   delaying the third set of satellite signals for a second time with respect to the first set; and
   determining the attitude factor by processing with the first set, the second set, and the third set and the fixed relationship.

18. The method of claim 17, wherein the delaying steps utilize a length of cable.

19. The method of claim 18, wherein the first time is approximately 200 nanoseconds.

20. The method of claim 17, wherein the attitude factor includes an azimuth angle and an elevation angle.

* * * * *